(12) United States Patent
Shen et al.

(10) Patent No.: US 7,916,477 B2
(45) Date of Patent: Mar. 29, 2011

(54) BATTERY COVER LATCH MECHANISM AND PORTABLE ELECTRONIC DEVICE USING SAME

(75) Inventors: Zhi-Yun Shen, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 188 days.

(21) Appl. No.: 12/254,099

(22) Filed: Oct. 20, 2008

(65) Prior Publication Data

US 2009/0290304 A1  Nov. 26, 2009

(30) Foreign Application Priority Data

May 21, 2008  (CN) .......................... 2008 1 0301693

(51) Int. Cl.
*G06F 1/16* (2006.01)
*H01M 2/10* (2006.01)
*H04M 1/00* (2006.01)

(52) U.S. Cl. ................... 361/679.58; 429/97; 455/575.1

(58) Field of Classification Search .......... 361/679.01–679.45, 679.55–679.59; 429/97, 100; 455/575.1, 575.8
See application file for complete search history.

(56) References Cited

U.S. PATENT DOCUMENTS

| 5,607,792 | A  | * | 3/1997 | Garcia et al. .................... 429/97 |
| 6,623,049 | B2 | * | 9/2003 | Shreeve et al. .................. 292/19 |
| 6,660,427 | B1 | * | 12/2003 | Hukill et al. .................... 429/97 |
| 7,309,253 | B2 | * | 12/2007 | Ge et al. ........................ 439/500 |
| 7,442,464 | B2 | * | 10/2008 | Li .................................... 429/97 |
| 7,531,268 | B2 | * | 5/2009 | Huang ............................ 429/97 |
| 2006/0166083 | A1 | * | 7/2006 | Zhang et al. .................... 429/97 |
| 2006/0172183 | A1 | * | 8/2006 | Chen et al. ...................... 429/97 |
| 2007/0026298 | A1 | * | 2/2007 | Chen ............................... 429/97 |

* cited by examiner

*Primary Examiner* — Zachary M Pape
*Assistant Examiner* — Nidhi Desai
(74) *Attorney, Agent, or Firm* — Steven M. Reiss

(57) ABSTRACT

A battery cover latch mechanism (10) used in portable electronic device (100) is described including a cover member (11), a housing member (12), a latching assembly (13), and a return member (16). The latching assembly slides between a released position and a latched position. The return member is secured to the cover member including two elastic sheets (136) elastically resisting a same side of the latching assembly. The elastic sheets connect with each other. The elastic sheet is used to return the latching assembly towards the latched position.

18 Claims, 5 Drawing Sheets

BATTERY COVER LATCH MECHANISM AND PORTABLE ELECTRONIC DEVICE USING SAME

BACKGROUND

1. Field of the Invention

The invention relates to battery cover latch mechanisms used in portable electronic devices.

2. Description of Related Art

Portable electronic devices usually include latch mechanisms used to latch battery covers to housings. The latch mechanisms must tolerate frequent installation and removal of batteries relative to the housings.

A typical battery cover latch mechanism includes at least one spring to facilitate the operation thereof. However, the spring may easily wear out after repeated operation and, thus the battery cover latch mechanism may fail.

Therefore, there is room for improvement within the art.

BRIEF DESCRIPTION OF THE DRAWINGS

Many aspects of the exemplary battery cover latch mechanism and a portable electronic device using the battery cover latch mechanism can be better understood with reference to the following drawings. These drawings are not necessarily drawn to scale, the emphasis instead being placed upon clearly illustrating the principles of the exemplary battery cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
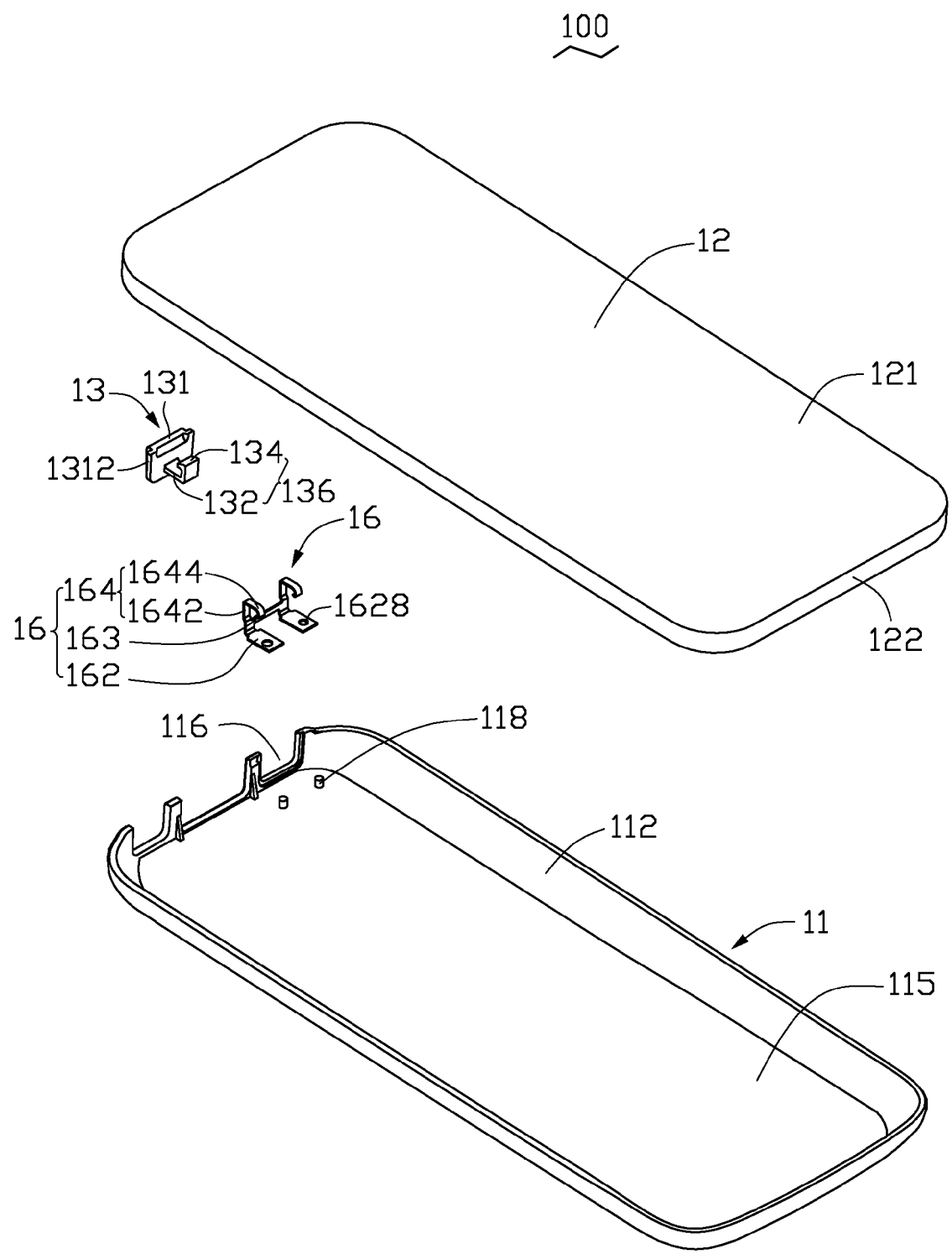
FIG. 1 is an isometric, exploded view of a portable electronic device incorporating a battery cover latch mechanism according to the exemplary embodiment.

FIG. 1 shows a portable electronic device 100 including a battery cover latch mechanism including a cover member 11, a housing member 12, a latching assembly 13, and a return member 16. The housing member 12 can be a housing of the portable electronic device 100. The cover member 11 can be a cover of the portable electronic device 100. The latching assembly 13 is configured to be mounted between the housing member 11 and the cover member 12 for latching the cover member 12 to the housing member 11. The return member 16 is used to facilitate the latching of the latching member 13.

The cover member 11 has a first peripheral wall 112, a bottom wall 113 (shown in FIG. 2), and a battery chamber 115. The first peripheral wall 112 surrounds the battery chamber 115. The battery chamber 115 can accommodate a battery (not shown). One end of first peripheral wall 112 defines a generally rectangular notch 116. The bottom wall 113 has two mounting columns 118 formed thereon, near the notch 116.

Figure 2:
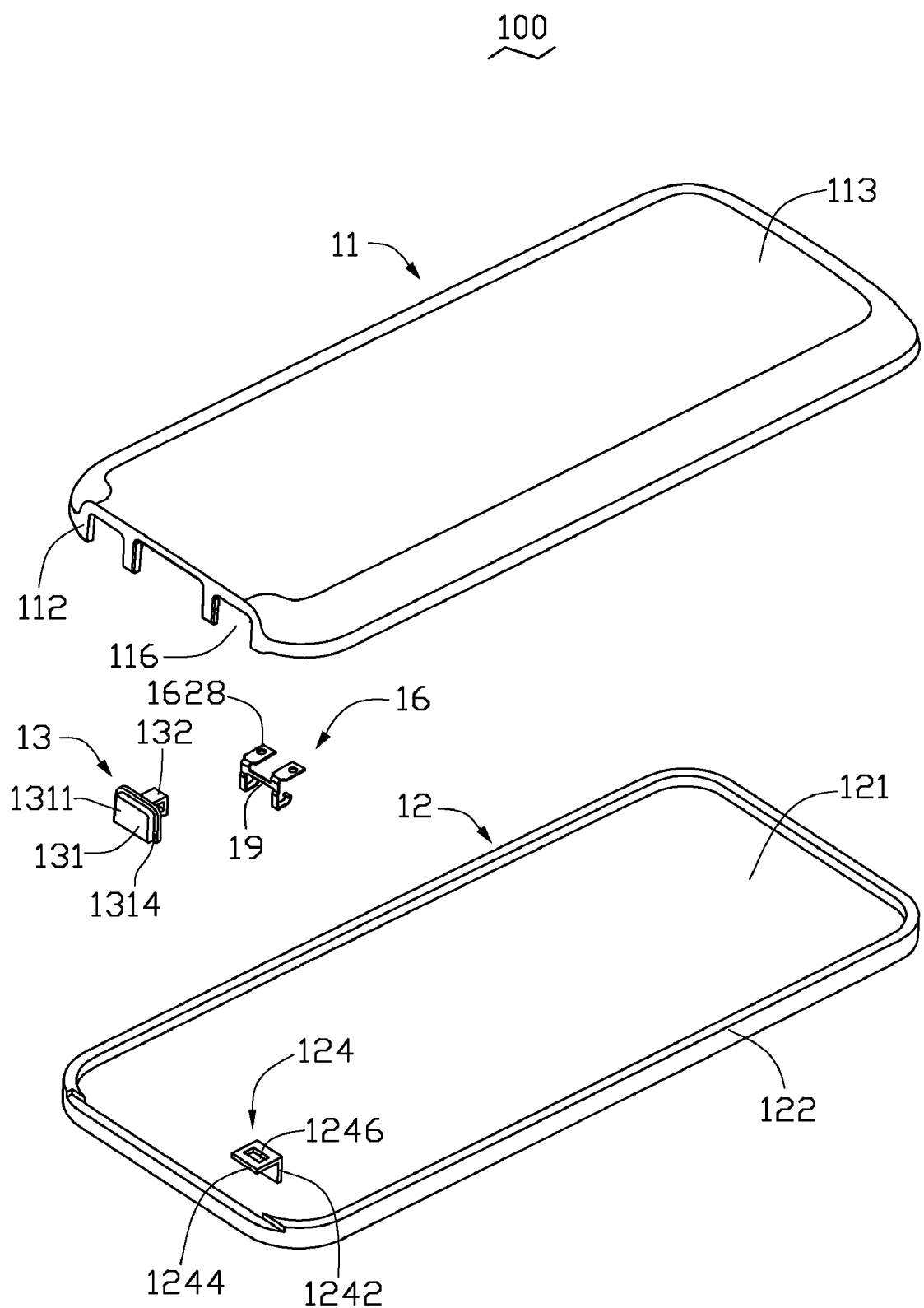
FIG. 2 is similar to FIG. 1, viewed from another angle.

The housing member 12 includes a second peripheral wall 122 and an upper wall 121. The second peripheral wall 122 is configured to mate with the first peripheral wall 112 (best shown in FIG. 3). Referring also to FIG. 2, one end of the upper wall 121 forms a generally L-shaped first claw 124 near the second peripheral wall 122. The first claw 124 has a first claw portion 1244 and a first connecting portion 1242 connecting the first claw portion 1244 to the upper wall 121. The first claw portion 1244 defines a hole 1246.

The latching assembly 13 includes a stepped pressing portion 131 with a generally L-shaped protrusion. The L-shaped protrusion is defined by a second claw 136 protruding from a side of the pressing portion 131. The second claw 136 has a second claw portion 134 and a second connecting portion 132 connecting the second claw portion 134 to the pressing portion 131.

Figure 4:
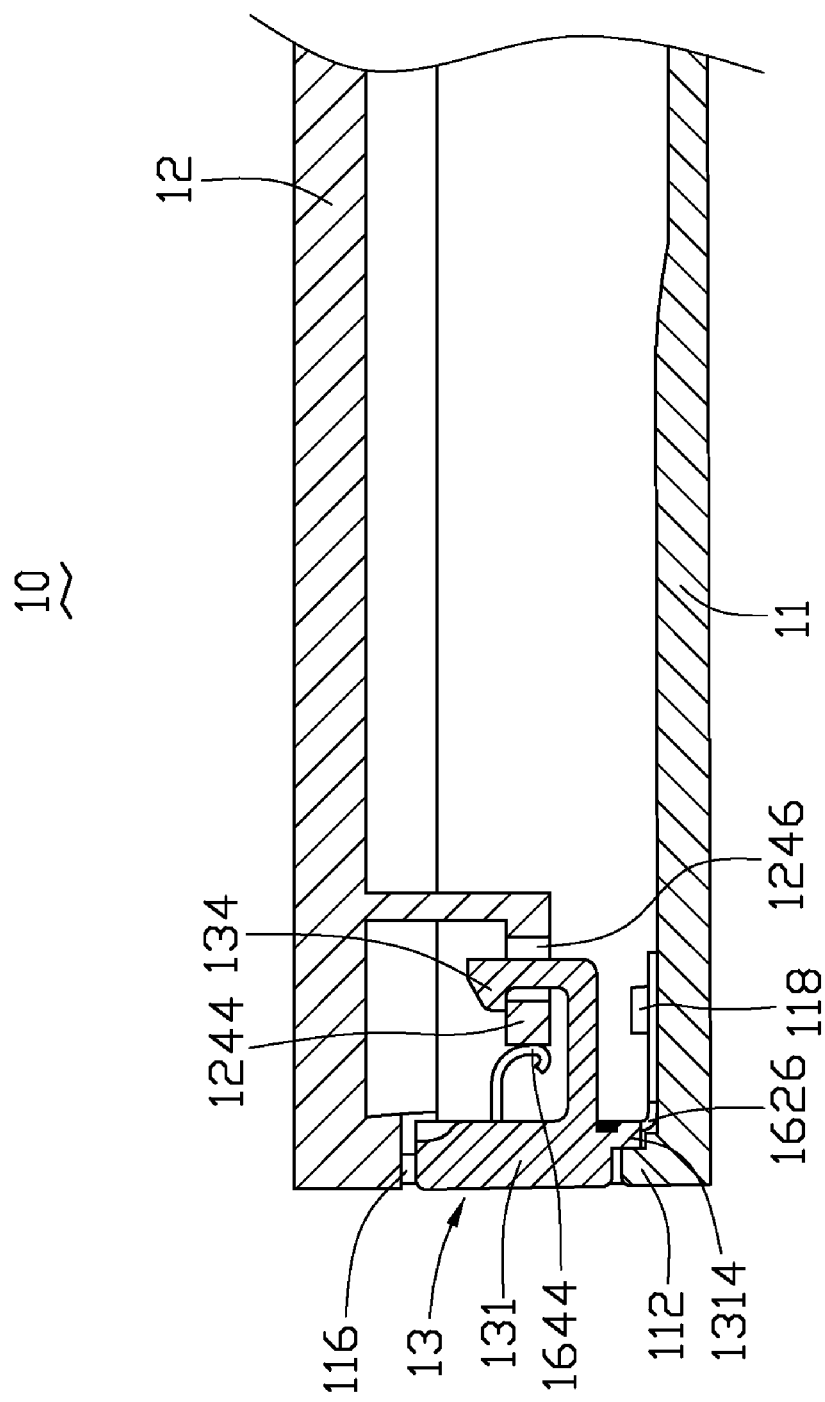
FIG. 4 is a sectional view of the battery cover latch mechanism shown in FIG. 3.
Figure 5:
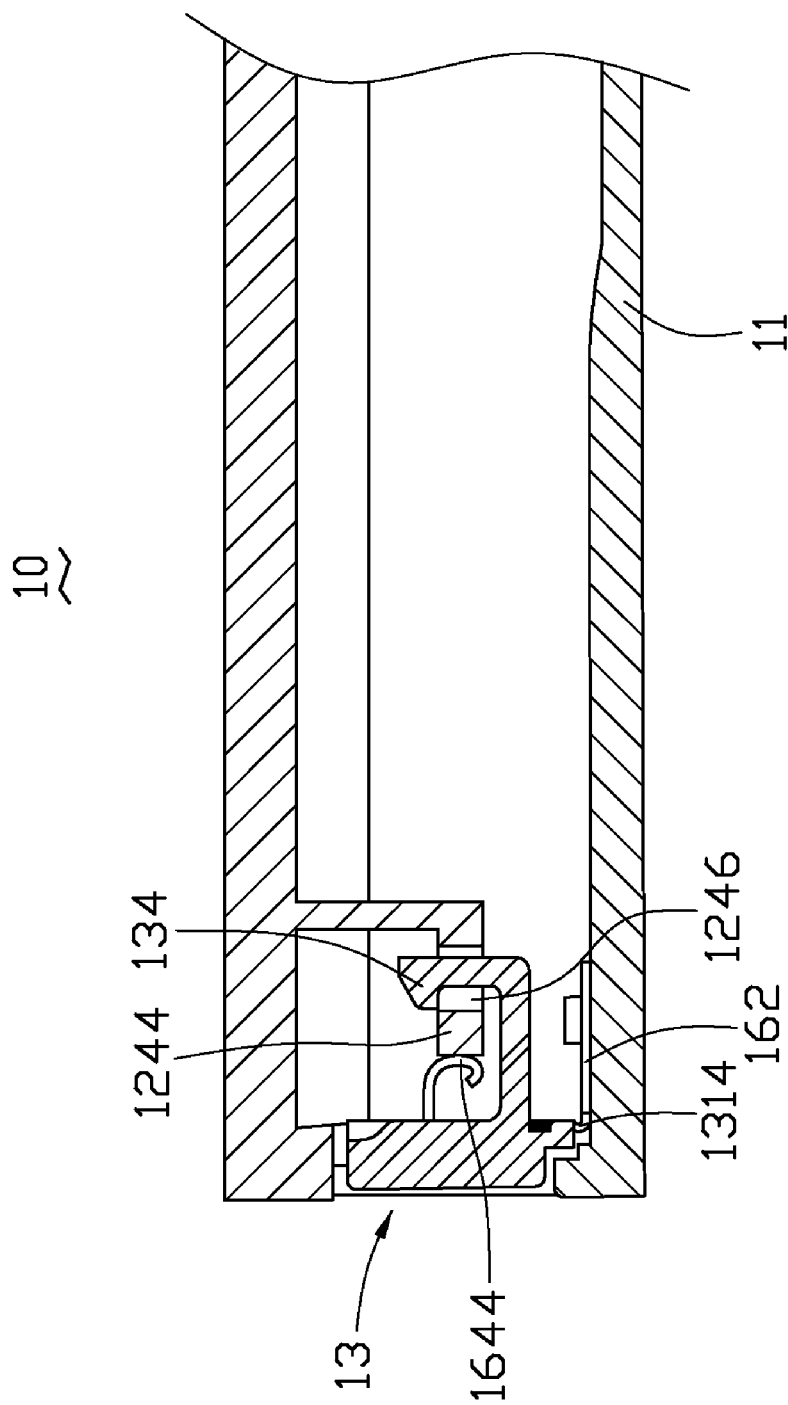
FIG. 5 is similar to FIG. 4, but showing a released position.

Referring also to FIGS. 4 and 5, the pressing portion 131 is configured to be received in the notch 116 and slide within the notch 116. Two step parts 1312 of the pressing portion 131 are used to prevent the pressing portion 131 from falling out of the notch 116. The second claw portion 134 corresponds to the first claw portion 1244 and is configured to pass through the hole 1246 to interlock with the first claw portion 1244.

The return member 16 includes two generally rectangular mounting portions 162, two generally L-shaped elastic sheets 164, and a straight bridge portion 163. The two elastic sheets 164 connect the two mounting portions 162, respectively. The two elastic sheets 164 are cross-bridged by the bridge portion 163. The two mounting portions 162 define two mounting holes 1628 corresponding to the two mounting columns 118, respectively. The mounting portions 162 can be secured to the bottom wall 113 by e.g., hot melting of the mounting columns 118 within the mounting holes 1628. The two elastic sheets 164 can be elastically deformed relative to the two mounting portions 162, respectively. The elastic sheets 164 include two first resisting portions 1642 and two second resisting portions 1644. The first resisting portions 1642 connect the second resisting portions 1644 and the mounting portions 162. The first resisting portions 1642 connect with each other by the bridge portion 163.

Figure 3:
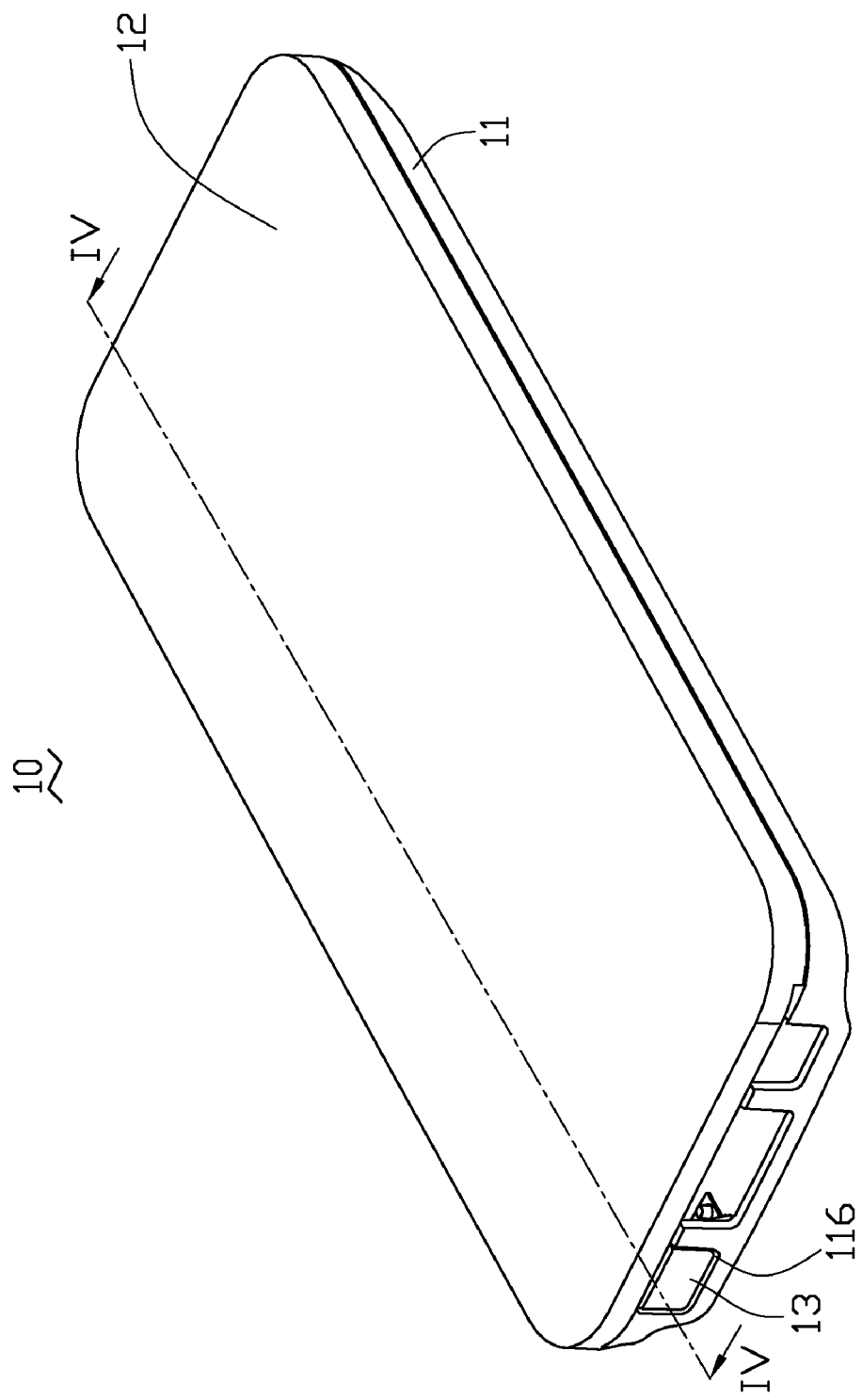
FIG. 3 is an isometric view of the battery cover latch mechanism at a latched position.

Referring to FIGS. 3 and 4, the battery cover latch mechanism is in a latched position. The cover member 11 is latched to the housing member 12 by the interlocking of the first claw 124 and the second claw 136. The second claw portion 134 passes through the hole 1246 of the first claw 124 to interlock with the first claw portion 1244. The elastic sheet 164 is elastically deformed along with the first resisting portion 1642 biasing the pressing portion 131 and the second resisting portion 1644 biasing against the first claw portion 1244. Oppositely, the pressing portion 131 is secured within the notch 116 by the biasing of the interior surface of the first peripheral wall 112 against the step parts 1312.

Referring to FIG. 5, when the cover member 11 needs to be released from the housing member 12, the pressing portion 131 is pressed further into the notch 116. During this stage, the second claw portion 134 is moved away from the first claw portion 1244 until they are no longer interlocked. The elastic sheet 164 is continuously deformed. As the interlocking is removed, the second claw portion 134 can pass through the hole 1246. Thus, the cover member 11 can be simply pulled apart from the housing member 12 by pulling the second claw portion 134 through the hole 1246.

Concerning the latching the cover member 11 to the housing member 12, the principle is similar to the above releasing process, but in reverse.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism, comprising: a cover member; a housing member; a latch member positioned between the cover member and the housing member and, configured for sliding between a released position and a latched position; and a return member secured to the cover member, comprising two elastic sheets elastically resisting a same side of the latch member, the elastic sheets connecting with each other and configured for biasing the latch member towards the latched position, the return member comprising two mounting portions fixed to the cover member, the elastic sheet comprising two cross-bridged first resisting portions and two second resisting portions, each of the first resisting portion positioned between and connected to the respective mounting portion and the respective second resisting portion, the second resisting portions configured for biasing against the housing member, and the first resisting portions configured for biasing against the latch member; wherein the two second resisting portions connect substantially perpendicularly to the first resisting portions, respectively, and the two first resisting portions connect substantially perpendicularly to the two mounting portions, respectively, the combination of the one first resisting portion, the one second resisting portion and the one mounting portion is substantially parallel to the other combination of the other first resisting portion, the other second resisting portion and the other mounting portion.

2. The battery cover latch mechanism as claimed in claim 1, wherein:
   the housing member comprises a first claw including a first claw portion, the first claw portion defining a hole; and
   the latch member comprises a second claw including a second claw portion, the second claw portion configured for passing through the hole to interlock with the first claw portion.

3. The battery cover latch mechanism as claimed in claim 2, wherein:
   the housing member further comprises an upper wall, the first claw formed on the upper wall;
   the first claw further comprises a first connecting portion connecting the first claw portion to the upper wall;
   the latch member further comprises a pressing portion and the second claw formed on the pressing portion; and
   the second claw further comprises a second connecting portion connecting the second claw portion to the pressing portion.

4. The battery cover latch mechanism as claimed in claim 3, wherein the elastic sheets are deformable relative to the mounting portions.

5. The battery cover latch mechanism as claimed in claim 4, wherein the mounting portion comprises a mounting hole, the cover member comprises a mounting column secured within the mounting hole.

6. The battery cover latch mechanism as claimed in claim 5, wherein the return member further comprises a bridge portion connecting the two elastic sheets with each other, the bridge portion positioned between the two elastic sheets and the two mounting portions.

7. The battery cover latch mechanism as claimed in claim 6, wherein the first resisting portions connecting connect with each other by the bridge portion.

8. The battery cover latch mechanism as claimed in claim 7, wherein
   the cover member comprises a peripheral wall defining a notch; and
   the pressing portion is positioned in the notch and can slide within the notch.

9. The battery cover latch mechanism as claimed in claim 1, wherein:
   the elastic sheets comprises two first resisting portions and two second resisting portions, the first resisting portions connecting the second resisting portions;
   the housing member comprises a first claw including a first claw portion, the first claw portion defining a hole;
   the latch member comprises a second claw including a second claw portion, the second claw portion configured for passing through the hole to interlock with the first claw portion, whereas the elastic sheet is elastically deformed along with the first resisting portion resisting against the latch member and the second resisting portion resisting against the first claw portion.

10. A portable electronic device, comprising: a cover; a housing; a battery cover latch mechanism comprising: a latch member positioned between the cover and the housing and, configured for sliding between a released position and a latched position; and a return member secured to the cover, comprising two elastic sheets elastically resisting a same side of the latch member, the elastic sheets connecting with each other and configured for biasing the latch member towards the latched position, the return member comprising two mounting portions fixed to the cover, the elastic sheet comprising two cross-bridged first resisting portions and two second resisting portions, each of the first resisting portion positioned between and connected to the respective mounting portion and the respective second resisting portion, the second resisting portions configured for biasing against the housing, and the first resisting portions configured for biasing against the latch member; wherein the two second resisting portions connect substantially perpendicularly to the first resisting portions, respectively, and the two first resisting portions connect substantially perpendicularly to the two mounting portions, respectively, the combination of the one first resisting portion, the one second resisting portion and the one mounting portion is substantially parallel to the other combination of the other first resisting portion, the other second resisting portion and the other mounting portion.

11. The portable electronic device as claimed in claim 10, wherein:
   the housing comprises a first claw including a first claw portion, the first claw portion defining a hole; and
   the latch member comprises a second claw including a second claw portion, the second claw portion configured for passing through the hole to interlock with the first claw portion.

12. The portable electronic device as claimed in claim 11, wherein:
   the housing further comprises an upper wall, the first claw formed on the upper wall;
   the first claw further comprises a first connecting portion connecting the first claw portion to the upper wall;
   the latch member further comprises a pressing portion and the second claw formed on the pressing portion; and
   the second claw further comprises a second connecting portion connecting the second claw portion to the pressing portion.

13. The portable electronic device as claimed in claim 12, wherein the elastic sheets are deformable relative to the mounting portions.

14. The portable electronic device as claimed in claim 13, wherein the mounting portion comprises a mounting hole, the cover comprises a mounting column secured within the mounting hole.

15. The portable electronic device as claimed in claim 14, wherein the return member further comprises a bridge portion connecting the two elastic sheets with each other, the bridge portion positioned between the two elastic sheets and the two mounting portions.

16. The portable electronic device as claimed in claim 15, wherein the first resisting portions connect with each other by the bridge portion.

17. The portable electronic device as claimed in claim 16, wherein
the cover comprises a peripheral wall defining a notch; and
the pressing portion is positioned in the notch and can slide within the notch.

18. The portable electronic device as claimed in claim 10, wherein:
the elastic sheets comprises two first resisting portions and two second resisting portions, the first resisting portions connecting the second resisting portions;
the housing comprises a first claw including a first claw portion, the first claw portion defining a hole;
the latch member comprises a second claw including a second claw portion, the second claw portion configured for passing through the hole to interlock with the first claw portion, wherein the elastic sheet is elastically deformed along with the first resisting portion resisting against the latch member and the second resisting portion resisting against the first claw portion.

* * * * *